Aug. 15, 1967 W. F. ALLER 3,336,090
MACHINE ASSEMBLY
Filed April 1, 1965
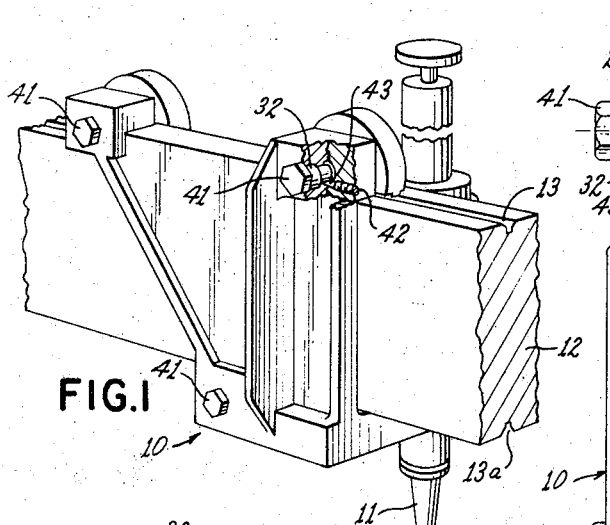
FIG.1
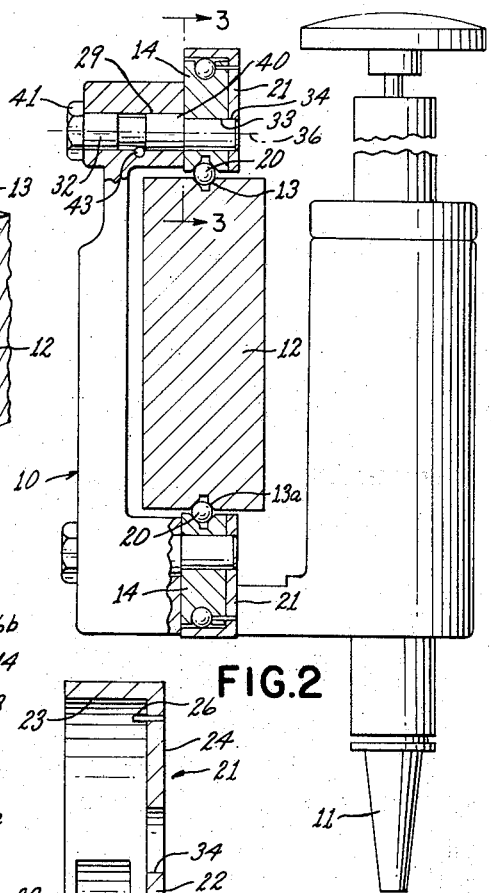
FIG.2
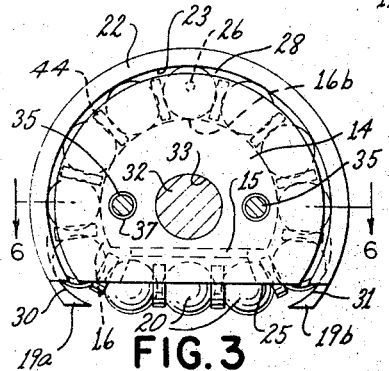
FIG.3
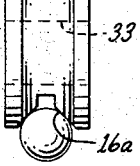
FIG.4
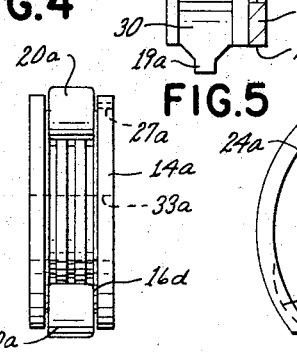
FIG.5
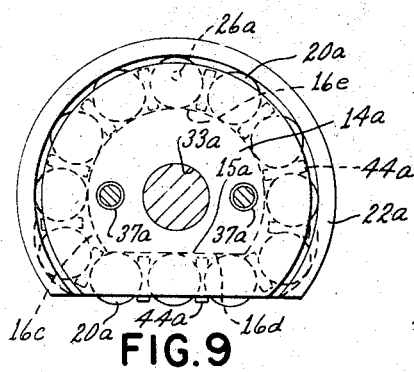
FIG.9
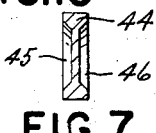
FIG.10
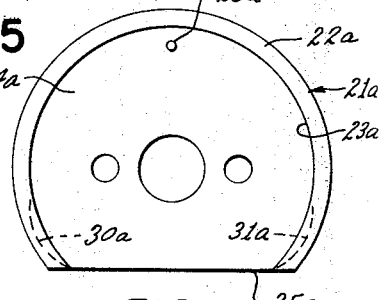
FIG.11
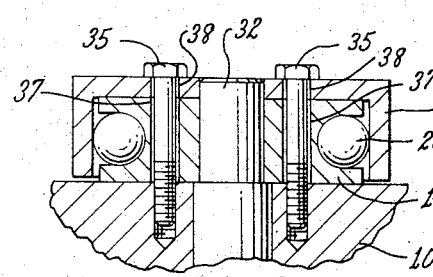
FIG.6
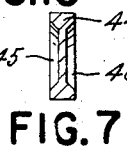
FIG.7
FIG.8
FIG.12
INVENTOR
WILLIS FAY ALLER
BY Ernest J. Nix
ATTORNEY

United States Patent Office 3,336,090
Patented Aug. 15, 1967

3,336,090
MACHINE ASSEMBLY
Willis Fay Aller, Dayton, Ohio, assignor to The Sheffield Corporation, Dayton, Ohio, a corporation of Delaware
Filed Apr. 1, 1965, Ser. No. 444,569
5 Claims. (Cl. 308—6)

ABSTRACT OF THE DISCLOSURE

An improved recirculating bearing device for supporting relatively movable cooperating members and having a pivoting and eccentric adjusting means. Free bearing pivoting allows self-alignment of the bearing device with the cooperating member and the eccentric adjustment relative to the member on which it is mounted provides adjustments transverse the bearing surface.

---

This invention pertains to precision antifriction bearing devices and more particularly to such devices employing rolling bearing means.

One object of this invention is the provision of an improved precision antifriction bearing device using rolling bearing means which is of simple construction, employs a minimum of component parts, and is economical to produce, versatile in application and efficient in operation.

Another object of this invention is the provision of such a device wherein rolling bearing means such as balls circulate about an inner member and act for load transmittal between a straight side thereof and an opposing cooperating bearing surface, said device having features for adjustment of said inner member relative to its supporting structure in a direction transverse said bearing surface and for optimum positioning of said straight side in its alignment relative to such surface, whereby said device provides precision support for relative movement while having broad application and readily accommodating manufacturing variances without expensive correction.

Another object of this invention is the provision of such a device wherein an inner member is pivotally self-adjustable on its supporting structure with respect to a cooperating bearing surface upon contact of said rolling bearing means with both said inner member and said cooperating surface, thus assuring proper alignment of said inner member with respect to said cooperating surface and thereby promoting smooth precision movement of said rolling bearing means and full cooperation between all active components.

Another object of this invention is the provision of such a device including eccentric means carrying said inner member on an associated structure for adjustment with respect thereto to obtain relative movement of the associated structure and the bearing surface with which said bearing means cooperate in a direction transverse such surface, whereby such positioning is achieved as desired, and manufacturing variances and variances through wear are readily accommodated without expensive reworking.

Another object of this invention is the provision of such a device using a plurality of separate spacers arranged alternately between each rolling bearing means, such spacers providing an interlocking action between each bearing means as well as providing lubrication and noise dampening during recirculation of said bearing means and separate spacers together.

Another object of this invention is the provision of such a device having rolling bearing means which are mounted for precision movement while in direct contact with a cooperating bearing surface, which surface may include means guiding the movement of said rolling bearing means on said surface.

Another object of this invention is the provision of such an improved device in which said rolling bearing means are confined for recirculating movement in a bearing race which is arranged in a plane generally perpendicular to said cooperating bearing surface and formed in a housing which also includes means for decreasing the angle said rolling bearing means and said spacers ascend from said bearing surface in order to recirculate about the bearing race.

Another object of this invention is the provision of a carriage having a plurality of such bearing devices attached thereto providing controlled precision movement thereof on a cooperating structure which has spaced apart bearing surfaces with which each bearing device cooperates, such carriage and bearing device being versatile in application and capable of compensating for defects in the structure associated therewith.

Other objects and advantages of the invention will be apparent from the following description, the appended claims, and the accompanying drawing, in which, FIG. 1 illustrates a perspective view with parts broken away showing an exemplary application of the bearing device of this invention used to carry a measuring machine gaging probe for precise linear movement, FIG. 2 is a part end view and part sectional view of the device of FIG. 1 particularly showing the arrangement of bearing devices of this invention associated with opposed cooperating bearing surfaces, FIG. 3 is a section on the line 3—3 of FIG. 2, FIG. 4 illustrates an end view of the inner member of the device of FIG. 3 showing a ball bearing at the top and bottom thereof, FIG. 5 illustrates a vertical section of the outer housing of the device of FIG. 3 particularly showing a pickup tab for the ball bearings, FIG. 6 is a sectional view on the line 6—6 of FIG. 3 illustrating the fastening means for the bearing device, FIGS. 7 and 8 are enlarged end and side views respectively showing a spacer used in the device of FIG. 3, FIG. 9 shows a view of another exemplary embodiment of the invention taken on a line similar to line 3—3 and using roller bearings, FIG. 10 illustrates an end view of the inner member of the device of FIG. 9 showing a roller bearing at the top and bottom thereof, FIG. 11 is a view of the outer housing of the assembly of FIG. 9 looking toward the inside part of the outer wall, and FIG. 12 is an enlarged fragmentary view showing the roller receiving pockets on each side of a spacer used in the device of FIG. 10.

In the exemplary embodiment of the invention illustrated in FIGS. 1–8 precision recirculating bearing devices embodying the present invention are employed to support a first structure or carriage 10 carrying a work engaging probe 11 of a measuring machine for precision movement on a second cooperating structure 12 having opposed cooperating bearing surfaces 13 and 13a thereon shown as V-shaped surfaces in FIGS. 1 and 2 of this example. Carriage 10 has inner members 14 mounted thereon and is supported for frictionless precision movement on such cooperating bearing surfaces through the use of precision rolling bearing means engaging on opposite sides thereof with the respective surface and inner member.

In the embodiment of FIGS. 1–8 each inner member or disk 14 is of generally circular disk-like construction. Disk 14 includes a straight side shown as a straight chordal side 15. The particular disk design used in the measuring device of FIGS. 1 and 2 is shown in more detail in FIGS. 3 and 4.

Disk 14 has rolling bearing race means 16 therein including a race portion 16a, preferably V-shaped, extending along said straight chordal side 15 and an arcuate portion 16b (preferably of rounded cross section) extending in disk 14 from one end to the opposite end of said straight chordal side 15 to form a continuous path therewith. The bearing race means 16 comprises the inner race of the precision recirculating device of this invention.

As previously mentioned rolling bearing means provide frictionless movement of disk 14 and its associated structure. The rolling bearing means employed may be ball bearing means, roller bearing means or other rolling bearing configurations. Ball bearing means or ball bearings 20 are employed in the exemplary embodiment of FIGS. 1-8 and are closely associated along the continuous path formed by bearing race 16 with a plurality thereof lying along the race portion 16a in disk 14 for cooperation between the race portion of chordal side 15 thereof and a cooperating surface such as the linear cooperating bearing surface 13. Ball bearings 20 carry loads acting between disk 14 and cooperating bearing surface 13. In this embodiment bearings 20 transmit the load of movable inner member 14, carriage 10, and probe 11 to supporting structure 12. It will be apparent that inner member 14 and its associated components could be fixed and support thereon a movable structure having a cooperating bearing surface.

Outer member means or housing 21 confines ball bearings 20 for recirculation about bearing race 16. In this exemplary embodiment of the invention such housing is of the same general outside configuration as disk 14, and as will be apparent from FIG. 5 has a wall 22 with an inside retaining surface 23 lying along the circular periphery shown at 28 of inner member 14. Surface 23 confines and guides the recirculation of bearings 20 as they move about race portion 16b of disk 14. Surface 23 is preferably a right circular cylindrical surface. Housing 21 has a wall portion 24 which fits over the flat outer surface of inner member 14 and a straight side 25 corresponding to straight side 15 of disk 14. A roll pin 26 is fixed to wall 24 and cooperates with a hole 27 in disk 14 to assure straight side 25 of housing 21 is not skewed out of alignment with side 15 thus preventing possibility of binding of the ball bearings 20.

Guide means is provided in said outer member means for engaging and guiding ball bearings 20 for smooth entry into the continuous path provided by bearing race 16. Preferably such guide means decreases the ramp angle that ball bearings 20 must ascend in order to enter section 16b of bearing race 16 in order to be recirculated. Wall 22 has an arcuate cut therein shown at 30 and 31 adjacent each end of straight side 25 of housing 21 to thereby decrease the previously mentioned ramp angle. The smaller ramp angle results in a minimum force being required to move the carriage 10 back and forth on its supporting structure. FIGS. 3 and 5 also show that in this embodiment of the invention, wall 22 has tabs 19a and 19b the inside surface of which is a continuation of arcuate cut 30 and 31 respectively. Tabs 19a and 19b cooperate with V-shaped opposing bearing surface 13 in the supporting structure. These projecting tabs extend below the center line of ball bearings 20 in their operating positions and assure that with carriage movement in either direction the ball bearings 20 are picked up out of the recess formed by V-shaped bearing surface 13 and recirculated about the bearing race 16b. It will be apparent that in those instances where the cooperating bearing surface is not recessed, wall 22 will not have projecting tabs, but will be similar to wall 22a of the embodiment shown in FIG. 11 with the lower extremity thereof extending below the center line of ball bearings 20 and thus assure proper pickup thereof. Such an arrangement would be equally effective whether the cooperating surface is flat or a curved surface such as a cylindrical surface across which the carriage and ball bearings 20 move longitudinally.

Means is provided for mounting disk 14 for free pivoting movement and adjustment prior to operation with respect to cooperating bearing surface 13. Such means includes an elongated shaft 32 having a portion thereof journaled in a close fitting hole 33 in disk 14 about which such disk pivots freely with the pivoting axis 36 equidistant from the ends of chordal side 15. A corresponding clearance hole 34 is provided in surface 24 of housing 21 through which shaft 32 also passes. A second portion of shaft 32 is in turn supported in bearing means or a cylindrical journal surface 29 in first structure or carriage 10. The shaft portions are relatively eccentric for purposes later described.

Disk 14 is freely pivoted on carriage 10 about axis 36 by a plurality of ball bearings 20. Each bearing 20 engages, on one side thereof, the straight chordal side 15 of disk 14 and the cooperating bearing surface 13 on its opposite side. Through the joint action of bearings 20, disk 14 is pivotally positioned to an optimum position determined by the character of cooperating bearing surface 13. Ball bearings 20 exert positioning forces against the straight chordal side 15 of disk 14 through lever arms determined by the point at which each ball bearing 20 exerts a force against straight side 15 to thus pivotally position disk 14 to said optimum position.

Once disk 14 has been properly pivoted as described above, means such as a pair of bolts 35 (see FIG. 6) are provided for fastening the disk in said optimum position. Bolts 35 pass through pairs of holes 37 and 38 in inner member 14 and housing 21 respectively and thread into carriage 10. The diameter of holes 37 and 38 are larger than the diameter of bolts 35 and permit member 14 to be freely pivoted about shaft 32 as previously described and then drawn up tightly prior to operation.

Means is provided for mounting disk 14 adjustably on carriage 10. Such means includes in this embodiment of the invention an eccentric portion 40 on elongated shaft 32 journaled in disk 14. Upon rotation of shaft 32 with the end thereof journaled in cylindrical bearing surface 29, disk 14 is adjustably positioned with respect to carriage 10 in a direction generally transverse to bearing surface 13. This arrangement permits precision adjustments of the carriage 10 and its supported components transverse the plane of cooperating bearing surface 13 without disturbing the relationship between disk 14 and bearing surface 13.

Shaft 32 is rotated by turning a hex head portion 41 thereof and thus relatively displace the position of disk 14 with respect to carriage 10. With shaft 32 adjusted to the desired position, a screw 42 is used, as illustrated in FIG. 1, to hold eccentric portion 40 in such adjusted position. Screw 42 is located below shaft 32 and has a tapered conical surface at one end, as illustrated at 43, which engages eccentric portion 40 to prevent further rotation of shaft 32 after reaching the desired position.

It will be appreciated that the transverse eccentric displacement of carriage 10 with respect to disk 14 is separate and distinct from the pivoting movement of disk 14 about shaft 32. Such pivoting movement being controlled by the opposed bearing surface acting through the bearing means.

The features of the present invention also enhance use of a carriage to which a plurality of inner members or disks 14 may be mounted. As shown in FIG. 2 inner members 14 have ball bearings 20 which engage opposed bearing surfaces 13 and 13a on supporting structure 12. Through the unique pivoting and eccentric action carriage 10 carrying gaging probe 11 is supported and guided for efficient movement because each inner member adjusts to the character of its associated supporting structure. Furthermore the pivoting feature of each inner member enables members 14 to exert a controlled clamping action on structure 12 thus promoting precision tracking without sway in a direction transverse to the direction of movement. The device of this invention may also be used with a carriage employing inner members arranged at any intermediate angle to each other for cooperation with corresponding opposing bearing surfaces.

It will be appreciated that through the joint action of the pivoting adjustments on each disk 14, probe 11 may be moved incrementally to compensate for deficiencies in the machine structure without expensive modification thereof.

Separate spacers 44 are provided and arranged alternately between ball bearings 20. During relative movement between disk 14 and cooperating bearing surface 13 with ball bearings 20 in load carrying relation, spacers 44 recirculate with bearings 20 about the continuous path defined by bearing race 16. Such spacers promote smooth frictionless movement with minimum noise. Spacers 44 have features of construction which enable them to provide controlled spacing between the bearings as well as hold such bearings together against movement transverse the direction of the continuous path defined by bearing race 16.

As illustrated in FIGS. 7 and 8 each spacer is of cylindrical configuration having a diameter smaller than ball bearings 20. Each spacer has opposed concave faces 45 and 46 and each face meshes with the spherical surface of an adjacent ball bearing 20. Spacers 44 are separate units which provide restraint against the previously mentioned transverse movement through such meshing action. Although spacers 44 may be constructed from any suitable material, they are preferably constructed of a suitable plastic material having lubrication qualities. The isolation of individual adjacent ball bearings from each other by spacers 44 assures that recirculating motion will be with minimum friction while also keeping noise levels at a minimum.

The use of spacers 44 also assures that there will be proper spacing of the ball bearings 20 in contact with chordal side 15 of disk 14 by preventing several ball bearings from stacking up at one side of chordal side 15 and producing an undesirable skewing action. It will be appreciated that by properly controlling the length of chordal side 15 coupled with proper selection of ball bearing diameter and spacer thickness at least a plurality of ball bearings will be in engagement with such disk 14 thereby providing proper pivoting thereof and sufficient bearing surface.

The embodiment of the invention of FIGS. 9–12 will now be described and this description will be abbreviated because of the similarity of components to those of the previous embodiment. An inner member or disk 14a of generally circular disk-like construction and similar to disk 14 is employed. Disk 14a includes a straight side shown as a straight chordal side at 15a and race means 16c including a portion 16d extending along said straight chordal side 15a and an arcuate portion 16e extending in disk 14a from one end to the opposite end of said straight chordal side 15a to form a continuous path therewith. Roller bearings 20a are employed in this embodiment, thus bearing race portions 16d and 16e are both U-shaped.

Disk 14a also has a generally centrally located hole 33a therein for cooperation with a shaft, such as an eccentric shaft, on which such disk is mounted.

A pair of holes 37a are provided in disk 14a to enable a pair of fastening bolts to pass therethrough and fasten such disk to an associated structure or carriage. Holes 37a are larger in diameter than the corresponding fastening bolts to enable disk 14a to pivot about its mounting shaft a limited amount as determined by a cooperating bearing surface before fastening of such disk at its pivoted position.

An outer means or housing 21a is provided for confining roller bearings 20a for recirculation. Housing 21a is of the same general outside configuration as disk 14a and has a wall 22a with an inside surface 23a. Wall 23a extends below the center line of roller bearings 20a for easy engagement and guiding of roller bearings 20a promoting smooth entry into the continuous path provided by bearing race 16a. Housing 21a has a flat wall 24a cooperating with a corresponding side of member 14a and wall 24a has a straight side 25a therein corresponding to side 15a. An arcuate cut is provided in wall 22a at 30a and 31a adjacent each end of straight side 25a for reasons previously explained. A roll pin 26a is also fastened in housing 21a for cooperation with hole 27a in inner member 14a to assure proper alignment of straight side 25a with respect to side 15a.

Separate spacers 44a of rectangular outline with roller receiving pockets on each side are provided and arranged alternately with bearings 20a. Such spacers recirculate with bearings 20a about race 16c and provide locking action as well as promoting smooth movement with minimum noise.

Thus it will be seen that the embodiment illustrated in FIGS. 9–12 using roller bearings could be easily adapted to the embodiment of the invention shown in FIG. 1 by providing a corresponding supporting bearing surface which is either flat or U-shaped to accommodate the roller bearings.

It will be apparent that the precision bearing device of this invention uses a few component parts which are of simple design thus making them easy to manufacture and assemble. Furthermore the novel features provided permit versatile application of this invention to numerous machines including precision measuring machines while also enabling precision adjustments to be made to said bearing device to compensate for wear and defects in other operating components of such machines. Manufacturing variances and variances through wear can be readily accommodated for extremely precise movement without requiring extreme precision in manufacture or expensive reworking. This invention also has advantages permitting use with cooperating bearing surfaces of different character through the use of the novel pivoting and eccentric adjustments, while smooth and noiseless recirculation of the bearing means is promoted through the use of the separate intermeshing spacers which recirculate with such bearing means.

While the forms of apparatus herein described constitute preferred embodiments of the invention, it is to be understood that the invention is not limited to these precise forms of apparatus and that changes may be made therein without departing from the scope of the invention which is defined in the appended claims.

What is claimed is:

1. A precision recirculating bearing device comprising, an inner member including a straight side,
bearing race means in said inner member along said straight side and extending therein from one end to the opposite end of said straight side to form a continuous path therewith,
rolling bearing means closely associated along said continuous path with a plurality thereof lying along the straight side of said inner member for cooperation between said straight side and a cooperating linear surface such that said rolling bearing means carry loads acting between said straight side of said inner member and said cooperating surface,
means for mounting said inner member for free pivoting movement with respect to said cooperating surface such that said plurality of rolling bearing means each engage said straight side of said inner member on one side thereof and said cooperating surface on its opposite side to pivotally position said inner member to an optimum position determined by the character of said cooperating surface,
means independent from and spaced radially to one side of said mounting means for fastening said inner member in said optimum position,
and outer member means comprising a generally cylindrical wall overlying one surface of said bearing race means, said cylindrical wall having an accurate cut therein at each terminal end thereof to thereby decrease the angle said rolling bearing means must ascend in order to be recirculated to and from said straight side of said bearing race means.

2. A precision recirculating bearing device for operation between first and second cooperating structures,
an inner member including a straight side,
bearing race means in said inner member along said straight side and extending therein from one end to the opposite end of said straight side to form a continuous path therewith,
rolling bearing means closely associated along said continuous path with a plurality thereof lying along the straight side of said inner member for cooperation between said straight side and an opposing bearing surface on said second structure such that said rolling bearing means carry loads acting between said first and second structures,
means for mounting said inner member on said first structure including an elongated shaft having a portion thereof journaled in said inner member about which it is free for pivoting movement such that said plurality of said bearing means engage said straight side of said inner member on one side thereof and said opposing bearing surface on its opposite side to pivotally position said inner member to an optimum position determined by the character of said opposing surface, said shaft having a cylindrical portion eccentric to said journal portion for rotatable mounting in said first structure for adjustable positioning of said inner member relative thereto in a direction transverse said bearing surface for precisely determining the relative positions of said first and second cooperating structures in that direction,
means for fastening said inner member to said first structure in said optimum and adjusted position,
and outer member means confining said bearing means for recirculation about said bearing race means to and from the straight side thereof.

3. A precision recirculating bearing device for operation between first and second cooperating structures,
an inner member including a straight side,
ball bearing race means in said inner member along said straight side and extending therein from one end to the opposite end of said straight side to form a continuous path therewith,
ball bearing means closely associated along said continuous path with a plurality thereof lying along the straight side of said inner member for cooperation between said straight side and an opposing bearing surface on said second structure such that said ball bearing means carry loads acting between said first and second structures,
means for mounting said inner member on said first structure including an elongated shaft having a portion thereof journaled in said inner member about which it is free for pivoting movement such that said plurality of said ball bearing means engage said straight side of said inner member on one side thereof and said opposing bearing surface on its opposite side to pivotally position said inner member to an optimum position determined by the character of said opposing surface, said shaft having a cylindrical portion eccentric to said journal portion for rotatable mounting in said first structure for adjustable positioning of said inner member relative thereto in a direction transverse said bearing surface for precisely determining the relative positions of said first and second cooperating structures in that direction,
means for fastening said inner member to said first structure in said optimum and adjusted position,
outer member means confining said ball bearing means for recirculation about said bearing race means to and from the straight side thereof,
and a plurality of separate circular spacers each having a diameter smaller than said ball bearing means and arranged alternately therebetween and movable therewith around said continuous path, said spacers having opposed concave faces each face meshing with an adjacent ball bearing means to thus hold said ball bearing means together in spaced relation such that with relative movement between said inner member and said cooperating surface with said ball bearing means in load carrying relation said ball bearing means and spacers recirculate about said bearing race and said spacers promote smooth frictionless movement with minimum noise.

4. A precision recirculating bearing device comprising,
an inner member of generally circular disk-like construction having a straight chordal side,
bearing race means in said inner member along said straight chordal side and extending therein from one end to the opposite end of said straight chordal side to form a continuous path therewith,
rolling bearing means closely associated along said continuous path with a plurality thereof lying along the chordal side of said inner member for cooperation between said chordal side and a cooperating linear surface such that said rolling bearing means carry loads acting between said chordal side of said inner member and said cooperating surface,
mounting means including a journal surface for mounting said inner member for free pivoting movement with respect to said cooperating surface and about an axis equidistant from the ends of said straight chordal side such that said plurality of rolling bearing means each engage said chordal side of said inner member on one side thereof and said cooperating surface on its opposite side to pivotally exert positioning forces against said inner member through lever arms determined by the point each rolling bearing means exerts a force against said straight side to thus position said inner member to an optimum position determined by the character of said cooperating surface, said mounting means further comprising a cylindrical portion eccentric to said journal surface and external of said inner member for adjustable positoning of said inner member in a direction transverse said cooperating surface for precisely determining the relative positions of said straight chordal side and said cooperating surface in that direction,
separately adjustable means spaced radially to one side of said mounting means for fastening said inner member in said optimum position,
and outer member means confining said bearing means for recirculation about said bearing race means to and from said chordal side thereof.

5. A precision recirculating bearing device comprising,
a carriage adapted for movement on a supporting surface,
inner member means of generally circular disk-like construction having a straight chordal side,
bearing race means in said inner member means along said straight chordal side and extending therein from one end to the opposite end of said straight chordal side to form a continuous path therewith,
rolling bearing means closely associated along said continuous path with a plurality thereof lying along the chordal side of said inner member between said chordal side and said supporting surface such that load carried by said carriage is transmitted through said chordal side of said inner member and through said rolling bearing means to said supporting surface,
means including eccentric means carrying said inner member for free pivoting movement and eccentric movement with respect to said carriage and with respect to said supporting surface such that said plurality of rolling bearing means engage said chordal side of said inner member means on one side thereof and said supporting surface on its opposite side to pivotally position said inner member to an optimum position determined by the character of said supporting surface, and said eccentric means provides adjustable positioning of said inner member with respect to said carriage in a direction transverse said bearing surface for precisely determining the relative positions of said inner member and carriage in that direction to thus achieve movements of the carriage and its supported components without disturbing the relationship between said inner member and said supporting surface, means for fastening said eccentric means in a fixed position relative to said carriage while allowing free pivoting of said inner member, means for independently fastening said inner member to said carriage in said optimum position, outer member means confining said bearing means for recirculation about said bearing race means to and from said straight chordal side, guide means in said outer member means for engaging and guiding said bearing means for smooth entry into said continuous path to either side of said straight side, and a plurality of separate spacers arranged alternately between said bearing means and movable therewith around said continuous path, said spacers holding said bearing means together in spaced relation such that with relative movement between said inner member means and said supporting surface with said bearing means in load carrying relation said bearing means and spacers recirculate about said bearing race and said spacers promote smooth frictionless movement with minimum noise.

References Cited

UNITED STATES PATENTS

| | | | |
|---|---|---|---|
| 1,405,894 | 2/1922 | Borg | 308—199 |
| 1,443,685 | 1/1923 | Huff | 308—62 |
| 1,750,140 | 3/1930 | Thompson | 308—6 |
| 2,620,163 | 12/1952 | Stone | 308—6 |
| 3,008,774 | 11/1961 | Morris et al. | 308—6 |
| 3,017,061 | 1/1962 | Hobart et al. | 308—62 |
| 3,101,978 | 8/1963 | Stallmann | 308—6 |
| 3,245,731 | 4/1966 | Erikson | 308—6 |

FOREIGN PATENTS 1,022,851  1/1958  Germany.

MARTIN P. SCHWADRON, *Primary Examiner.*

FRANK SUSKO, *Examiner.*